(12) United States Patent
Ovcharik et al.

(10) Patent No.: US 10,204,036 B2
(45) Date of Patent: Feb. 12, 2019

(54) SYSTEM AND METHOD FOR ALTERING APPLICATION FUNCTIONALITY

(71) Applicant: AO Kaspersky Lab, Moscow (RU)

(72) Inventors: Vladislav I. Ovcharik, Moscow (RU); Vitaly V. Kondratov, Moscow (RU); Evgeniya P. Kirikova, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/984,517

(22) Filed: May 21, 2018

(65) Prior Publication Data
US 2018/0267889 A1    Sep. 20, 2018

Related U.S. Application Data

(63) Continuation of application No. 14/498,037, filed on Sep. 26, 2014, now Pat. No. 10,002,070.

(30) Foreign Application Priority Data

Aug. 1, 2014  (RU) ................................ 2014131816

(51) Int. Cl.
*G06F 11/30*  (2006.01)
*G06F 11/34*  (2006.01)
(Continued)

(52) U.S. Cl.
CPC ............ *G06F 11/3692* (2013.01); *G06F 8/65* (2013.01); *G06F 11/0715* (2013.01);
(Continued)

(58) Field of Classification Search
CPC ............... G06F 11/3692; G06F 21/552; G06F 11/3051; G06F 11/0793; G06F 11/0778; G06F 11/0715; G06F 8/65
(Continued)

(56) References Cited

U.S. PATENT DOCUMENTS 7,216,343 B2   5/2007  Das et al.
8,775,578 B2   7/2014  Dehaan et al.
(Continued)

FOREIGN PATENT DOCUMENTS

RU        2295752 C1     3/2007
WO     2008002856 A2     1/2008

*Primary Examiner* — Melissa J Koval
*Assistant Examiner* — Trung Q. Nguyen
(74) *Attorney, Agent, or Firm* — Arent Fox LLP; Michael Fainberg (57) ABSTRACT

Disclosed are systems and methods for altering a functionality of an application installed in a computer. In one aspect, an exemplary method comprises, by a hardware processor of the computer, receiving an application update to the application, wherein the application update comprises one or more of a patch, service pack and software update, updating the application based on the application update by applying the application update to the application, detecting one or more events occurring on a computer after the updating of the application based on the application update, determining one or more portions of the application which caused the one or more events to occur on the computer, and altering the one or more portions of the application when a number of detected events exceeds a threshold, wherein how the one or more portions are altered depends on the one or more events.

18 Claims, 4 Drawing Sheets

(51) Int. Cl.
*G06F 11/36* (2006.01)
*G06F 8/65* (2018.01)
*G06F 11/07* (2006.01)
*G06F 21/55* (2013.01)

(52) U.S. Cl.
CPC ...... *G06F 11/0778* (2013.01); *G06F 11/0793* (2013.01); *G06F 11/302* (2013.01); *G06F 11/3003* (2013.01); *G06F 11/3051* (2013.01); *G06F 21/552* (2013.01); *G06F 11/3089* (2013.01); *G06F 11/3409* (2013.01); *G06F 2201/86* (2013.01); *G06F 2201/865* (2013.01)

(58) Field of Classification Search
USPC ..... 324/500–512, 600, 605–639, 677, 76.11, 324/76.61, 750.15–750.3, 755.01–758.01; 714/22, 47.1
See application file for complete search history.

(56) References Cited

U.S. PATENT DOCUMENTS

| | | |
|---|---|---|
| 8,799,888 B1 | 8/2014 | Fitzgerald et al. |
| 2006/0117310 A1 | 6/2006 | Daniels et al. |
| 2007/0016903 A1 * | 1/2007 | Maeomichi |
| 2007/0300215 A1 * | 12/2007 | Bardsley ............... G06F 8/65 717/168 |
| 2008/0141240 A1 | 6/2008 | Uthe |
| 2010/0306600 A1 | 12/2010 | Shinboku et al. |
| 2011/0225577 A1 | 9/2011 | Wookey et al. |
| 2011/0296248 A1 * | 12/2011 | Vidal ..................... G06F 8/65 714/38.13 |
| 2014/0013315 A1 | 1/2014 | Genevski et al. |

\* cited by examiner

| No | Event | Functional modules related to the events | Altering of functional modules |
|---|---|---|---|
| 1 | Application shuts down three times more often than before updating application | Encryption module | All modules turned off except encryption module |
| 2 | Application shuts down more than five times in one hour | Antispam module | Antispam module turned off |
| 3 | | File antivirus, antispam module | Antispam module turned off |
| 4 | Number of application freezes increased by more than two times | Encryption module | Parameters of encryption module changed |
| 5 | | File antivirus | Parameters of file antivirus changed |
| 6 | More than ten reboots of computer system in one week | File antivirus | All modules turned off except encryption module and file antivirus |
| 7 | Incorrect working of one or more functional application modules | File antivirus, antivirus database update module | Antivirus database update module turned off, report sent to administrator |
| 8 | | Encryption module | Encryption module changed to condition it was in before application update |

SYSTEM AND METHOD FOR ALTERING APPLICATION FUNCTIONALITY

CROSS-REFERENCE TO RELATED APPLICATIONS

This application is a continuation of pending U.S. patent application Ser. No. 14/498,037 filed on Sep. 26, 2014, which further claims benefit of priority under 35 U.S.C. 119(a)-(d) to a Russian Application No. 2014131816 filed on Aug. 1, 2014, which are incorporated by reference herein.

FIELD OF TECHNOLOGY

The invention relates generally to the field of computer software, and specifically, to systems and methods of altering functionality of an application installed on a computer.

BACKGROUND

A large number of modern computer applications are multifunctional software programs consisting of multiple modules having different functionality. Moreover, without halting the working of the application, services responsible for the working of certain functional modules can be turned on and off, thus reducing the load on the computer system.

The working capability of functional modules can be influenced by software updates of the application: along with the software updates, files and register keys may be downloaded which can influence the working of several functional modules. Even though software updates are supposed to eliminate errors in the working of an application or add new functional capabilities, it often happens that new errors will appear in the working of an application after a regular updating. Moreover, the new errors may affect not only the working of the application itself, but also the working of the computer system as a whole, and also have disastrous consequences for the data of the user. It is especially important to maintain the working capability of security applications, which not only afford protection against various computer threats but can also perform the encoding of the user's data.

Restoration tools are typically used to restore the working capability of an application or an operating system (OS), as well as eliminate errors in their operation. For example, the Windows OS uses a "System restore" component. This component enables a restoring of the working capability of the OS by rollback (restoration of the previous condition) of the system files, register branches, applications, and so forth. However, restoration points are not created for each update, and after the restoration of the system from the last restoration point many applications installed after its creation may not work correctly.

A method of testing of software updates with the possibility of rollback of updates in the event of unsatisfactory test results is also known. However, these methods do not always solve the problems of ensuring working capability of an application with installed updates and of the computer system without disconnecting the functionality causing the error in the working of the application or the OS, or rollback of the installed updates.

SUMMARY

Disclosed are systems, methods and computer program products for altering the functionality of an application upon incorrect operation of the application update. The technical result of the disclosed aspects is to increase the working stability of the computer by altering the functionality of an application based on certain events and functional modules.

In one aspect, an example method for altering application functionality of an installed on a computer includes: receiving, by a hardware processor, an application update to the application, wherein the application update comprises one or more of a patch, service pack and software update, updating, by the hardware processor, the application based on the application update by applying the application update to the application, detecting, by the hardware processor, one or more events occurring on a computer after updating the application based on the application update, determining, by the hardware processor, one or more portions of the application which caused the one or more events to occur on the computer, altering, by the hardware processor, the one or more portions of the application when a number of detected events exceeds a threshold, wherein how the one or more portions are altered depends on the one or more events.

In one aspect of the method, the one or more portions each correspond to functional modules of the application.

In one aspect of the method, altering the one or more portions is performed when the number of detected events exceeds a threshold over a predetermined time interval.

In one aspect of the method, the application update is (i) transmitted from a remote server to the computer via a network, or (ii) loaded into the computer from a removable data medium.

In one aspect of the method, wherein the one or more events comprises at least one of the following: an increase in number of application memory dumps per a predetermined time interval, an increase in number of operating system dumps per a predetermined time interval, an increase of average workload of a processor of the computer above a predetermined limit, an increase in number of reboots of the computer per a predetermined time interval, incorrect working of one or more functional modules of the application, freezing of the application; and freezing of traffic verification.

In one aspect of the method, the altering of the functional modules and which functional modules are altered further depends on a computer user's choice.

In one aspect of the method, the altering comprises at least one of the following: turning a functional module on, turning a functional module off, removing a functional module and changing settings of a functional module.

In one aspect of the method, the altering comprises reverting at least one functional module to its state before the update by: (a) replacing one or more files stored in a file system accessible to the computer with previous versions of the one or more files, and/or (b) modifying one or more registry keys of an operating system installed on the computer.

In one aspect of the method, the altering comprises removing at least one prior application update which affected functioning of an installed application update.

In one aspect, an example system for altering functionality of an application installed on a computer, comprises: one or more hardware processors configured to: receive an application update to the application, wherein the application update comprises one or more of a patch, service pack and software update, update the application based on the application update by applying the application update to the application, detect one or more events occurring on a computer after updating the application based on the application update, determine one or more portions of the application which caused the one or more events to occur on the computer, alter the one or more portions of the application when a number of detected events exceeds a threshold, wherein how the one or more portions are altered depends on the one or more events.

In one aspect, an example a computer-readable medium is provided storing instructions thereon that when executed perform a method for altering functionality of an application installed on a computer, the instructions comprising: receiving, by a hardware processor, an application update to the application, wherein the application update comprises one or more of a patch, service pack and software update, updating, by the hardware processor, the application based on the application update by applying the application update to the application, detecting, by the hardware processor, one or more events occurring on a computer after updating the application based on the application update, determining, by the hardware processor, one or more portions of the application which caused the one or more events to occur on the computer, altering, by the hardware processor, the one or more portions of the application when a number of detected events exceeds a threshold, wherein how the one or more portions are altered depends on the one or more events.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for altering functionality of an application. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
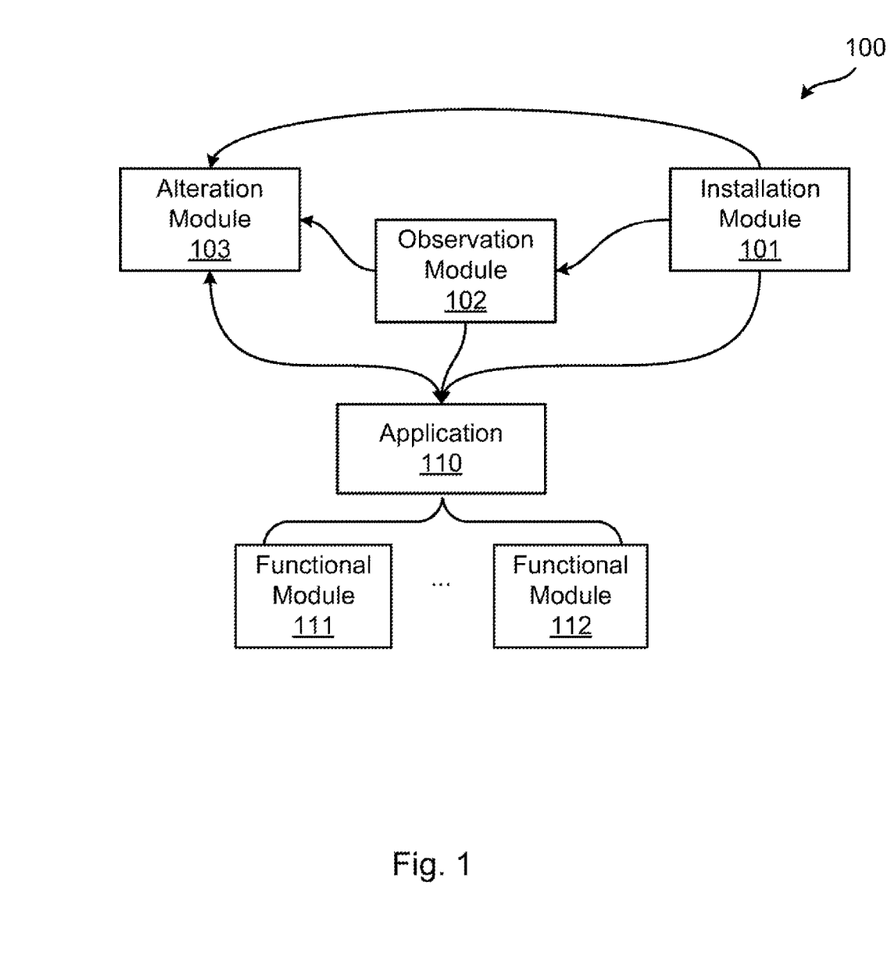
FIG. 1 illustrates a block diagram of an example system for altering the functionality of an application according to one aspect.

FIG. 1 shows an example system for altering functionality of an application according to one aspect of the invention. A software application 110 is installed on a computer system 100. The application 110 can be a browser, a word-, video-, or image-processing application, a system software (such as various utilities), and so on. In the aspect discussed herein, the application 110 is a security application or an antivirus application. In one example aspect, the application 110 includes a plurality of functional modules 111-112. In one aspect, modules 111-112 may be configured to perform different functions of the application.

The antivirus application 110 may contain functional modules configured to ensure security for the computer system 100. Such functional modules may include, but not limited to: a file antivirus module, an email antivirus module, a web antivirus module, an HIPS (Host Intrusion Prevention System) module, an encryption module, an anti-spam module, an antivirus database update module, an application update module, and so on. In one example aspect, the file antivirus module contains program code and logic for detecting harmful activity of all files being opened, run and stored on the user's computer system 100. In one example aspect, the email antivirus contains program code and logic for check incoming and outgoing email for harmful content. In one example aspect, the web antivirus modules contains program code and logic for preventing execution of malicious code which may be contained on web sites visited by the user, and also for blocking the opening of the web sites. In one example aspect, the HIPS module contains program code and logic for detecting unwanted and harmful activity of programs and to block such activity at the moment of program execution.

In one example aspect, the encryption module may contain program code and logic for encrypting files on the user's computer 100. Furthermore, the encryption module may contain full disk encryption functionality. In one example aspect, the anti-spam module may contain program code and logic for checking email messages for spam content. In one example aspect, the antivirus database update module may contain program code and logic for updating the signature database of malicious files. In one example aspect, the application update module may contain program code and logic for downloading updates from a software manufacturer's remote server (not shown) for the application 110 and to subsequently install them.

In one example aspect, the computer system 100 may include an installation module 101 that contains program code and logic for installing updates of the application 110. In some aspects, the installation module 101 may be one of the functional modules 111-112, as described above. In other aspects, the installation module 101 may be a separate application.

An application update can be a separate piece of software used to eliminate errors in the working of the application, to change its functional capabilities, to make changes in the operating system (OS) registry, to change application interface, to change application settings, to add, modify, or remove one or several functional modules and so on. The application update may be a program patch, a service pack, or also another kind of software update. The installation module 101 may be configured to receive the updates on the network from a remote server. The updates can also be loaded from a removable data medium (such as a flash memory or an optical disk) or by a local-area network (e.g., from a network disk or folder).

If an application update contains a new functionality not provided for by the user agreement, before installing the update the user may be prompted to accept a new user agreement including the new functionality. If the new user agreement is refused, only the part of the update not containing the new functionality may be installed on computer 100.

In one example aspect, the installation module 101 may be connected to an observation module 102 and alteration module 103. The installation module 101 may be configured to send to modules 102 and 103 a list of functional modules of application 110 that have been affected by the installed application update.

In one example aspect, the observation module 102 is configured to detect events associated with the behavior of the computer system 100 which have occurred since the application update. Such detectable events may be, but not limited to, for example, the computer 100 rebooting due to a system error, incorrect functioning of some of the functional modules 111-112 causing a termination of the functional modules or of the entire application 110, an increased load on the processor, a freezing of the application 110, and so on.

The alteration module 103 may be configured to identify the functional modules 111-112 which have influenced or caused the occurrence of the events detected by the observation module 102. The alteration module 103 also configured to alter the identified functional modules effected by the detected events, and the functional modules causing the occurrence of these events. For example, an update of the application 110 might have contained only an update of the files and the register branches for the encryption module. Thus, system reboots might have been caused by incorrect working of the encryption module. Consequently, the alteration module 103 will determine the encryption module to be the module responsible for the system reboots. To prevent incorrect working of the application 110 and the computer system 100, the alteration module 103 may turn the encryption module off, for example, until a release of an update eliminating the occurrence of system reboots. In one aspect, the alteration module 103 can report to the application 110 the need to turn off a corresponding functional module (for example, by creating a necessary registry key). The application in turn would unload services and processes corresponding to the functional module.

Figure 2:
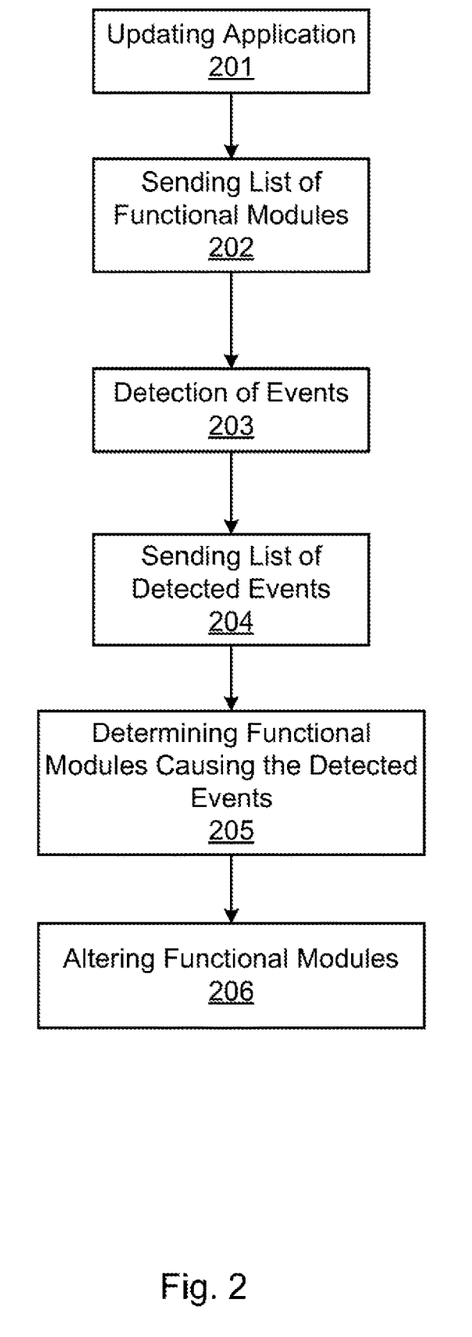
FIG. 2 illustrates a flow diagram of an example method for altering the functionality of an application according to one aspect.

FIG. 2 shows an example method of altering functional modules according to one aspect of the invention. At step 201, the installation module 101 may download an update for an application 110 from a remote server and install the update on the computer system 100. Since the application 110 comprises a plurality of functional modules 111-112, the update may affect some of the functional modules 111-112 (for example, it modifies some of the files or registry keys related to certain functional modules). In one example aspect, a list of the functional modules 111-112 affected by the update may be transmitted by the server to the computer 100 along with the update itself. Thus, in step 202, the installation module 101 may send the list of functional modules affected by the update to the observation module 102 and the alteration module 103.

The observation module 102 immediately after the update is installed begins in step 203 following and detecting occurrences of some types of events taking place in the system 100. These detectable events may include, but not limited to: shutdown of the application 110; increase in the average workload of a processor above a certain predetermined limit (e.g., the average processor workload becoming greater than 80% in the course of an hour); rebooting of the computer system 100 or the frequency of rebooting being too high within a predetermined time interval; incorrect working of one or more of the functional modules of the application 110; freezing of the application 110; and freezing of traffic verification.

The shutdown of the application 110 can be detected when a memory dump of the application 110 is created. The Windows Error Reporting service built into the Windows OS can be used for creating the memory dumps of the application 110 in the Windows OS. A separate debugging process launched by the application 110 at initialization can be responsible for creating memory dumps of the application 110. When the computer system 100 is working under Windows OS, a reboot of the computer system 100 can be detected using the Windows Event Log records, which contains information on important software and hardware events, including reboots of the computer system 100. However, in some cases information about reboot of the computer system 100 does not end up in the event log. A reboot of the computer system can be detected by presence of a memory dump. Savedump.exe utility enters data from the page file into the memory dump file memory.dmp upon occurrence of a system error and subsequent emergency shutdown of Windows.

Freezing of the application 110 or of some of the function modules 111-112 can be determined by analysis of the time taken for processing of system calls by the application 110. An increase above a certain threshold value (for example, 60 seconds) of the time taken for processing system calls by the application 110 may indicate a freezing thereof.

Heuristic algorithms may be used to analyze the processing time of system calls. For example, the following parameters may be set: minimum time (such as 10 seconds), maximum time (such as 60 seconds), and permissible number of delayed calls (such as 10 calls). If the number of system calls whose processing took between the minimum and maximum time exceeds the permissible number of delayed calls, this event may indicate a freezing of the application 110. Moreover, if the processing of even one system call exceeds the maximum time, this also may indicate a freezing of the application 110. It should be noted that the above given parameters are set by a remote server and may be changed periodically.

The freezing of the network traffic verification (TCP/IP protocol stacks) can be detected upon exceeding a certain threshold value by the network traffic processing time (for example, 10 minutes).

If the described events have become much more common (for example, twice as frequent) after the installing of the update compared with before the installing of the update, this may indicate an incompatibility of the installed update and the functional modules of the application. The error causing the reboot of the computer or the sudden shutdown of the application 110 may be contained either in the installed update or in one or more functional modules 111-112. The threshold values indicating the occurrence of the above events may be occasionally changed on a remote server.

In step 204, the observation module 102 may send the list of aforementioned events to the alteration module 103. Then, in step 205, the alteration module 103 determines which of the functional modules 111-112 have caused or influenced the occurrence of the aforementioned events. For example, the shutdown of the application 110 might have been caused by incorrect working of the anti-spam module after the updating of the application 110.

As a result, in step 206, the alteration module 103 may alter some of the functional modules 111-112 depending on the detected events and the functional modules causing these events. Altering of the functional modules 111-112 may include, but not limited to: turning on, turning off, or removing of some of the functional modules 111-112 (for example, removal of files, register keys, and also removal of elements of the user interface of the application 110 related to the encryption module). Altering of the functional modules may also include changing the settings of some of the functional modules 111-112. The settings of the update module may be changed so that only updates of the antivirus database are loaded, and not updates of the application 110, except the updates correcting the error that has occurred.

In one example aspect, the alteration module 103 may send a list of altered modules to a network or computer administrator, so that the administrator can make a decision on further altering of the functional modules 111-112 or canceling these changes.

Altering of the functional modules of the application may also include removal of the installed application update. The altering module 103 may also remove old updates of the application 110 if they have influenced the working of the new installed update of the application 110. A known system can optimally choose a computer environment for testing of application updates and make a decision on the basis of the test results (for example, if deviations occur in the normal working of the computer systems with the installed update) as to the need to install this update on the other computer systems containing the application. Based on the test results, this update will also be installed on the other computer systems, or it will be removed from those systems on which it was previously installed.

In step 206, before altering any of the functional modules, the user may be informed by the observation module 102 about the detected events and the functional modules causing them. Then the user or administrator can decide whether to alter the functional modules.

In one example aspect, an administrator can define which events can be monitored. For example, the administrator can provide, in step 203, for detecting all previously mentioned events, except for reboots of the computer system 100.

Figure 3:
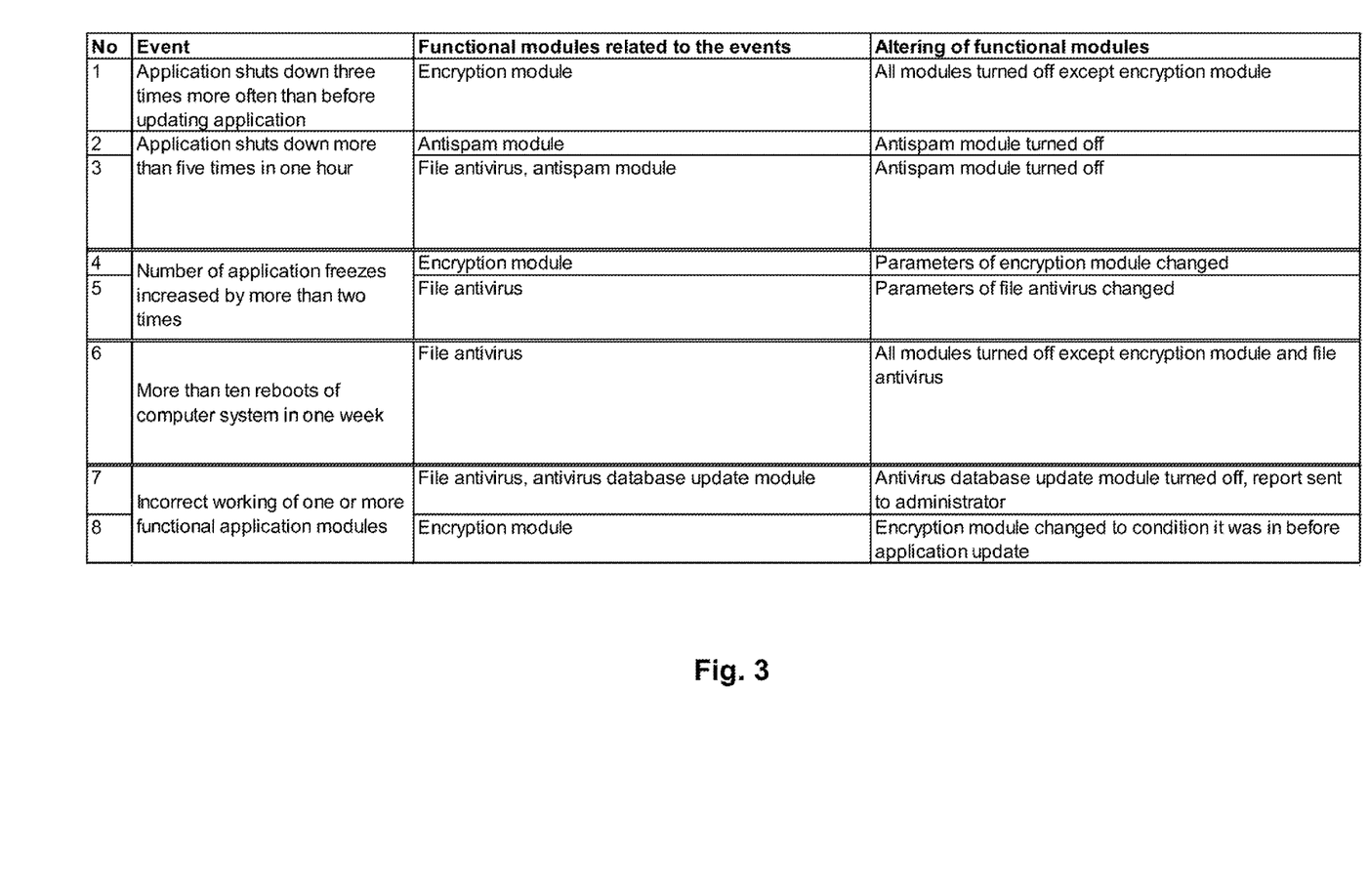
FIG. 3 illustrates example rules for altering the functionality of an application according to one aspect.

The table in FIG. 3 shows example rules for altering the functional modules 111-112 of the application 110 in step 206. These rules may be set in advance by an administrator of the computer system or the network. The set of rules may be occasionally changed on a remote server and then sent to the altering module 103 along with the updates of the application or the updates of the antivirus database, if the application 110 is an antivirus.

According to the first rule in the table, if the altering module 103 in step 205 has determined that the increase in the number of shutdowns of the application that is three times greater than the number of shutdowns of the application occurring before the installation of the application update was caused by incorrect working of the encryption module after installation of the application update, then in step 206 all functional modules of the application are turned off except for the encryption module. The encryption module is not turned off because the majority of the user's data might be encrypted, and the turning off might make it impossible for the user to work with their data.

The second rule in the table applies when the application has stopped working more than five times in the course of an hour. The second rule is used when the increase in the number of application freezes was caused by the working of the anti-spam module. According to this rule, in step 206 the anti-spam module is turned off, because this module has caused the increase in the number of application freezes and is not so critical to the user as, for example, the encryption module.

The sixth rule applies when the file antivirus is causing an increase in the number of reboots of the computer system (for example, more than 10 reboots per week). In this case, all modules are turned off except the encryption module and the file antivirus, which are the most important functional modules of the application to the user. If said alterations of the functional modules have not solved the problem of reboots of the computer system or have caused other undesired events, the observation of the behavior of the system is continued by the observation module 102, and the steps of the method shown in FIG. 2 are repeated. As a result, in step 206, some of the functional modules of the application are altered again.

In one example aspect, altering a functional module may include reverting the module to the condition in which it was before the application update—the new files of the update are replaced by the old files, the registry keys are changed, and so on. If the update has affected several functional modules, only the module causing the incorrect event might be changed. For example, according to the eighth rule in the table in FIG. 3, the encryption module is changed to the condition in which it was before the updating of the application, if it was this module which began to work incorrectly after the updating of the application.

Figure 4:
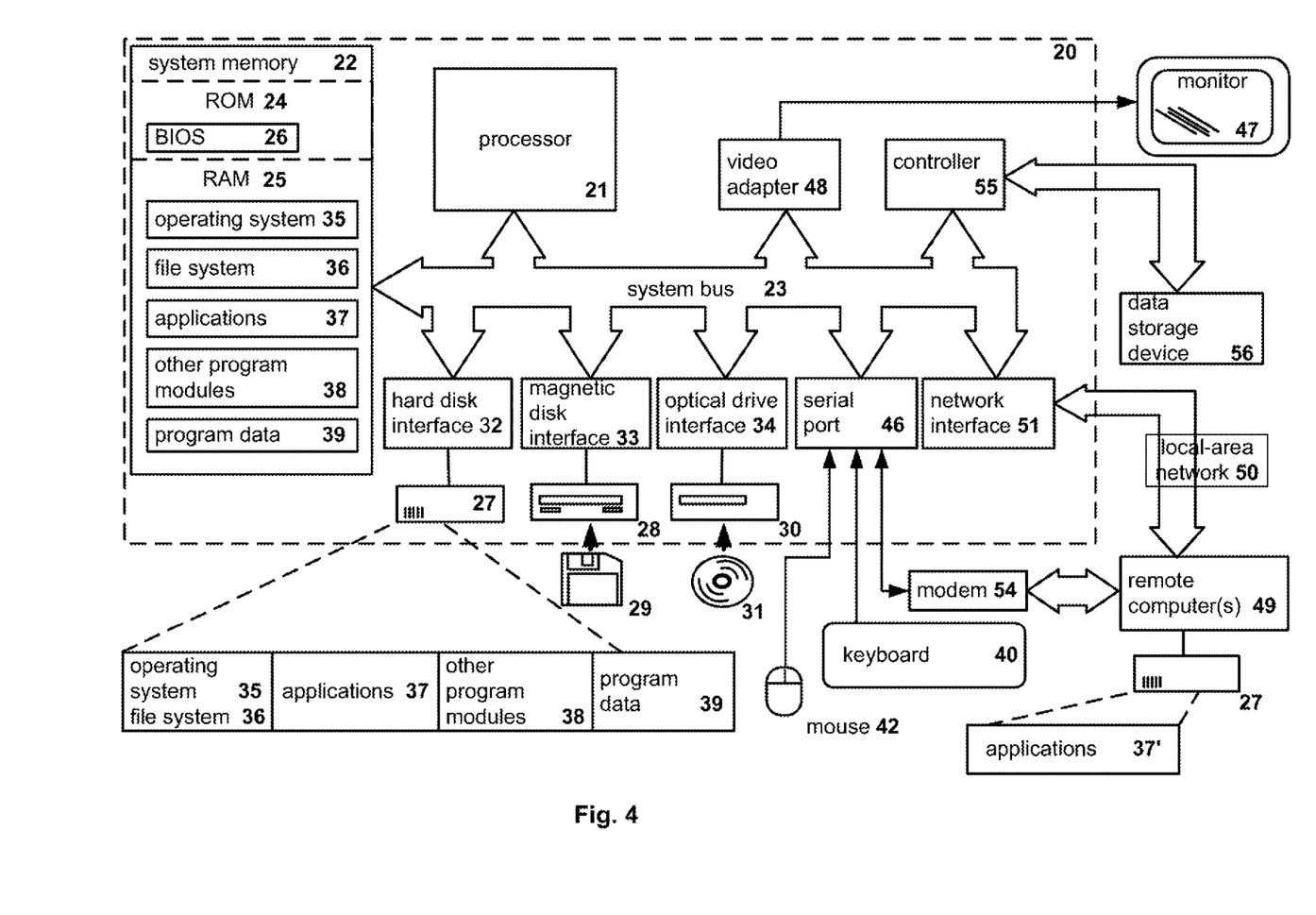
FIG. 4 is an example of a general-purpose computer system, such as a personal computer or a server, suitable for implementing discloses aspects of systems and methods for altering the functionality of an application according to one aspect.

FIG. 4 shows an example of a general-purpose computer system (which may be a personal computer or a server) 20, which may be used to implement system and methods for altering functionality of an application. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for altering a functionality of an application installed on a computer, the method comprising:
    receiving, by a hardware processor, an application update to the application, wherein the application update comprises one or more of a patch, service pack and software update, and wherein the application comprises one or more functional modules;
    updating, by the hardware processor, the application based on the application update by applying the application update to the application;
    detecting, by the hardware processor, one or more events occurring on the computer after the updating of the application based on the application update;
    determining, by the hardware processor, one or more portions of the application which caused the one or more events to occur on the computer; and
    altering, by the hardware processor, the one or more portions of the application when a number of detected events exceeds a threshold, wherein how the one or more portions are altered depends on the one or more events, and the altering comprises reverting at least one functional module to a state of the at least one functional module before the update by at least one of: (a) replacing one or more files stored in a file system accessible to the computer with previous versions of the one or more files, and (b) modifying one or more registry keys of an operating system installed on the computer.

2. The method of claim 1, wherein each of the one or more portions corresponds to a functional module of the one or more functional modules of the application.

3. The method of claim 2, wherein the altering of a functional module of the one or more functional modules and which of the one more of the functional modules are altered further depends on a choice of a user of the computer.

4. The method of claim 1, wherein the altering of the one or more portions is performed, when the number of detected events exceeds the threshold over a predetermined time interval.

5. The method of claim 1, wherein the application update is (i) transmitted from a remote server to the computer via a network, or (ii) loaded into the computer from a removable data medium.

6. The method of claim 1, wherein the one or more events comprises at least one of:
- an increase in a number of application memory dumps per a predetermined time interval;
- an increase in a number of operating system dumps per a predetermined time interval;
- an increase in an average workload of a processor of the computer above a predetermined limit;
- an increase in a number of reboots of the computer per a predetermined time interval;
- an incorrect working of a functional module of the one or more functional modules of the application;
- a freezing of the application; and
- a freezing of a traffic verification.

7. The method of claim 1, wherein the altering comprises at least one of:
- turning a functional module on;
- turning a functional module off;
- removing a functional module; and
- changing settings of a functional module.

8. The method of claim 1, wherein the altering comprises removing at least one prior application update which affected a functioning of an installed application update.

9. A system for altering a functionality of an application installed on a computer, comprising:
- one or more hardware processors configured to:
  - receive an application update to the application, wherein the application update comprises one or more of a patch, service pack and software update, and wherein the application comprises one or more functional modules;
  - update the application based on the application update by applying the application update to the application;
  - detect one or more events occurring on the computer after the updating of the application based on the application update;
  - determine one or more portions of the application which caused the one or more events to occur on the computer; and
  - alter the one or more portions of the application when a number of detected events exceeds a threshold, wherein how the one or more portions are altered depends on the one or more events, and the altering comprises reverting at least one functional module to a state of the at least one functional module before the update by at least one of: (a) replacing one or more files stored in a file system accessible to the computer with previous versions of the one or more files, and (b) modifying one or more registry keys of an operating system installed on the computer.

10. The system of claim 9, wherein each of the one or more portions corresponds to a functional module of the one or more functional modules of the application.

11. The system of claim 10, wherein the altering of a functional module of the one or more functional modules and which of the one or more functional modules are altered further depends on a choice of a user of the computer.

12. The system of claim 9, wherein the altering of the one or more portions is performed when the number of detected events exceeds the threshold over a predetermined time interval.

13. The system of claim 9, wherein the application update is (i) transmitted from a remote server to the computer via a network, or (ii) loaded into the computer from a removable data medium.

14. The system of claim 9, wherein the one or more events comprises at least one of:
- an increase in a number of application memory dumps per a predetermined time interval;
- an increase in a number of operating system dumps per a predetermined time interval;
- an increase in an average workload of a processor of the computer above a predetermined limit;
- an increase in a number of reboots of the computer per a predetermined time interval;
- an incorrect working of a functional module of the one or more functional modules of the application;
- a freezing of the application; and
- a freezing of a traffic verification.

15. The system of claim 9, wherein the altering comprises at least one of:
- turning a functional module on;
- turning a functional module off;
- removing a functional module; and
- changing settings of a functional module.

16. The system of claim 9, wherein the altering comprises removing at least one prior application update which affected a functioning of an installed application update.

17. A computer-readable medium storing instructions thereon that when executed perform a method for altering a functionality of an application installed on a computer, the instructions comprising:
- receiving, by a hardware processor, an application update to the application, wherein the application update comprises one or more of a patch, service pack and software update, and wherein the application comprises one or more functional modules;
- updating, by the hardware processor, the application based on the application update by applying the application update to the application;
- detecting, by the hardware processor, one or more events occurring on the computer after the updating of the application based on the application update;
- determining, by the hardware processor, one or more portions of the application which caused the one or more events to occur on the computer; and
- altering, by the hardware processor, the one or more portions of the application when a number of detected events exceeds a threshold, wherein how the one or more portions are altered depends on the one or more events, and the altering comprises reverting at least one functional module to a state of the at least one functional module before the update by at least one of: (a) replacing one or more files stored in a file system accessible to the computer with previous versions of the one or more files, and (b) modifying one or more registry keys of an operating system installed on the computer.

18. The medium of claim 17, wherein each of the one or more portions corresponds to a respective functional module of the one or more functional modules of the application.

\* \* \* \* \*